United States Patent
Gao et al.

(10) Patent No.: US 12,399,624 B2
(45) Date of Patent: Aug. 26, 2025

(54) ELECTRONIC DEVICE, METHOD OF DETERMINING MEMORY ACCESS EFFICIENCY FOR MEMORY, AND STORAGE MEDIUM

(71) Applicant: KUNLUNXIN TECHNOLOGY (BEIJING) COMPANY LIMITED, Beijing (CN)

(72) Inventors: Daheng Gao, Beijing (CN); Liang Shan, Beijing (CN); Yupeng Li, Beijing (CN); Chen Feng, Beijing (CN)

(73) Assignee: KUNLUNXIN TECHNOLOGY (BEIJING) COMPANY LIMITED, Beijing (CN)

( * ) Notice: Subject to any disclaimer, the term of this patent is extended or adjusted under 35 U.S.C. 154(b) by 151 days.

(21) Appl. No.: 18/520,325

(22) Filed: Nov. 27, 2023

(65) Prior Publication Data
US 2024/0134532 A1    Apr. 25, 2024

(30) Foreign Application Priority Data
Mar. 24, 2023 (CN) .......... 202310310122.X (51) Int. Cl.
*G06F 3/06* (2006.01)
(52) U.S. Cl.
CPC .......... *G06F 3/0613* (2013.01); *G06F 3/0659* (2013.01); *G06F 3/0673* (2013.01)
(58) Field of Classification Search
CPC ..... G06F 3/0613; G06F 3/0659; G06F 3/0673
See application file for complete search history.

(56) References Cited

U.S. PATENT DOCUMENTS

| | | | |
|---|---|---|---|
| 2019/0146717 A1* | 5/2019 | Khan | G06F 12/0646 711/154 |
| 2020/0065028 A1* | 2/2020 | Keil | G06F 13/1673 |

FOREIGN PATENT DOCUMENTS

| | | |
|---|---|---|
| CN | 114003453 | 2/2022 |
| CN | 115562850 | 1/2023 |

(Continued)

OTHER PUBLICATIONS

Ma, Sheng, et al. "Coordinated DMA: improving the DRAM access efficiency for matrix multiplication." IEEE Transactions on Parallel and Distributed Systems 30.10 (2019): 2148-2164. (Year: 2019).*

(Continued)

*Primary Examiner* — Nicholas J Simonetti
(74) *Attorney, Agent, or Firm* — Pillsbury Winthrop Shaw Pittman, LLP (57) ABSTRACT

An electronic device, a method of determining a memory access efficiency for a memory, and a storage medium are provided, which relate to a field of computer technology, and in particular to fields of chip, memory and processor technologies. The electronic device includes: a memory configured to store executable instructions and data to be processed; and a processor configured to execute the executable instructions so as to at least: read a data block to be tested from the memory; determine a memory access description information according to a size information of the data block to be tested; and determine, according to the memory access description information and a channel description information, a memory access efficiency of the processor in reading the data block to be tested, where the channel description information describes a plurality of channels for the processor to read the data to be processed from the memory.

20 Claims, 4 Drawing Sheets

(56) References Cited

FOREIGN PATENT DOCUMENTS

| | | |
|---|---|---|
| JP | H1153300 | 2/1999 |
| JP | 2008176765 | 7/2008 |
| JP | 2017516197 | 6/2017 |
| JP | 2018074250 | 5/2018 |
| JP | 2021026769 | 2/2021 |
| JP | 2021111319 | 8/2021 |
| KR | 20140113438 | 9/2014 |
| KR | 20160094764 | 8/2016 |
| KR | 101990735 | 6/2019 |
| KR | 20210019125 | 2/2021 |

OTHER PUBLICATIONS

Office Action issued in corresponding Japanese Patent Application No. 2023-204882, dated Dec. 17, 2024.
Office Action issued in corresponding Korean Patent Application No. 10-2023-0168246, dated Dec. 20, 2024.

\* cited by examiner

ELECTRONIC DEVICE, METHOD OF DETERMINING MEMORY ACCESS EFFICIENCY FOR MEMORY, AND STORAGE MEDIUM

This application claims the benefit of priority of Chinese Patent Application No. 202310310122.X filed on Mar. 24, 2023, the whole disclosure of which is incorporated herein by reference.

TECHNICAL FIELD

The present disclosure relates to a field of computer technology, and in particular to fields of chip, memory and processor technologies. More specifically, the present disclosure provides an electronic device, a method of determining a memory access efficiency for a memory, and a storage medium.

BACKGROUND

With a development of artificial intelligence technology and computer technology, an operator based on an artificial intelligence (AI) chip may be developed. In order to improve a performance of the operator, it is possible to improve a hardware utilization of the operator.

SUMMARY

The present disclosure provides an electronic device, a method of determining a memory access efficiency for a memory, and a storage medium.

According to an aspect of the present disclosure, an electronic device is provided, including: a memory configured to store executable instructions and data to be processed, where the data to be processed is divided into a plurality of data blocks; and a processor configured to execute the executable instructions so as to: read a data block to be tested in the plurality of data blocks from the memory; determine a memory access description information according to a size information of the data block to be tested, where the memory access description information includes a read period information and a data read interval; and determine, according to the memory access description information and a channel description information, a memory access efficiency of the processor in reading the data block to be tested, where the channel description information describes a plurality of channels for the processor to read the data to be processed from the memory.

According to another aspect of the present disclosure, a method of determining a memory access efficiency for a memory is provided, including: reading a data block to be tested in a plurality of data blocks from the memory; determining a memory access description information according to a size information of the data block to be tested, where the memory access description information includes a read period information and a data read interval; and determining a memory access efficiency of reading the data block to be tested according to the memory access description information and a channel description information, where the channel description information describes a plurality of channels for reading the data to be processed from the memory.

According to another aspect of the present disclosure, an electronic device is provided, including: at least one processor; and a memory communicatively connected to the at least one processor, where the memory stores instructions executable by the at least one processor, and the instructions, when executed by the at least one processor, are configured to cause the at least one processor to implement a method provided in the present disclosure.

According to another aspect of the present disclosure, a non-transitory computer-readable storage medium having computer instructions therein is provided, and the computer instructions are configured to cause a computer to implement a method provided in the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure. In the accompanying drawings.

DETAILED DESCRIPTION OF EMBODIMENTS

Exemplary embodiments of the present disclosure will be described below with reference to accompanying drawings, which include various details of embodiments of the present disclosure to facilitate understanding and should be considered as merely exemplary. Therefore, those ordinary skilled in the art should realize that various changes and modifications may be made to embodiments described herein without departing from the scope and spirit of the present disclosure. Likewise, for clarity and conciseness, descriptions of well-known functions and structures are omitted in the following description.

A memory-intensive operator may include a general matrix multiplication (GEMM) operator and a convolution (conv) operator. It is possible to improve a bandwidth utilization of the memory-intensive operator on a video memory, so as to optimize the operator. In a case of a limited internal cache of a chip, data to be processed may be partitioned into blocks. Before starting the operator, it is possible to determine a memory access time for different matrix partitioning methods. In some cases, a channel conflict may affect an overall data access time. For example, in a case of a channel conflict, a bandwidth efficiency may be a reciprocal of the number of channels (channel number, cn), that is, 1/cn.

In some embodiments, the method of partitioning the data to be processed may be optimized so that each memory access is allocated to as many channels as possible to effectively utilize the bandwidth of multiple channels. However, in the case of limited internal cache, increasing a bandwidth for a read operation may result in a decrease in a bandwidth for a write operation. If the memory access efficiency of a specific memory access width may not be evaluated quantitatively, it is difficult to determine a better data partitioning method.

In some embodiments, processing may be performed for a specific data read offset (ld). For example, the specific data read offset may be a product of the number of channels and a channel width (ig). When determining the partitioning method, a bandwidth efficiency penalty may be added for the specific data read offset, so that a final partitioning method may maximize a use of bandwidth of multiple channels. However, if a difference between the data read offset and the specific data read offset is small, it is difficult to determine an appropriate partitioning method. In addition, if the data read offset is an integer multiple or 0.5 times of the specific data read offset, it is also difficult to determine an appropriate partitioning method.

In order to improve a data processing efficiency, the present disclosure provides an electronic device, which will be described below.

Figure 1:
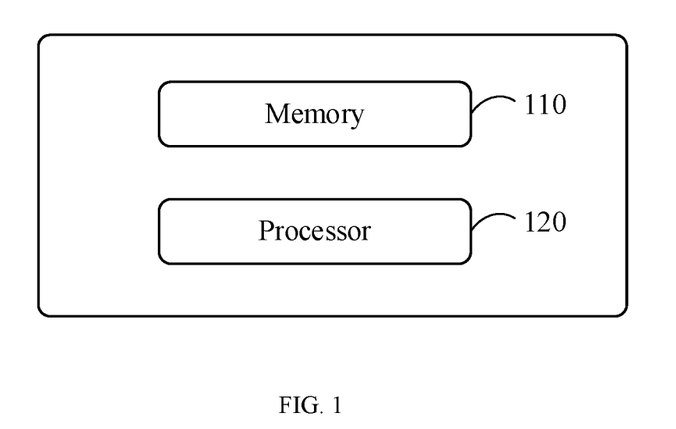
FIG. 1 shows a schematic diagram of an electronic device according to an embodiment of the present disclosure.

FIG. 1 shows a schematic diagram of an electronic device according to an embodiment of the present disclosure.

As shown in FIG. 1, an electronic device 100 may include a memory 110 and a processor 120.

The memory 110 may be used to store executable instructions and data to be processed.

In embodiments of the present disclosure, the data to be processed may be divided into a plurality of data blocks. For example, the data to be processed may be partitioned according to any partitioning method, so as to obtain a plurality of data blocks.

In embodiments of the present disclosure, the memory may be a double data rate synchronous dynamic random access memory (DDR) or a graphics memory (GDDR).

The processor 120 may be used to execute the executable instructions so as to: read a data block to be tested in the plurality of data blocks from the memory; determine a memory access description information according to a size information of the data block to be tested; and determine a memory access efficiency of the processor in reading the data block to be tested, according to the memory access description information and a channel description information.

In embodiments of the present disclosure, any data block in the plurality of data blocks may be used as the data block to be tested.

In embodiments of the present disclosure, the memory access description information may include a read period information and a data read interval. For example, the data block to be tested may be implemented as a matrix. The size information of the data block to be tested may include a number of rows and a number of columns. The read period information may be determined according to the number of columns. The data read interval may be determined according to the number of rows. In an example, the read period information may indicate that one row data in the matrix is read in each read period. The row data includes a same number of values as the number of columns. The data read interval is related to all values of the matrix.

In embodiments of the present disclosure, the channel description information describes a plurality of channels for the processor to read the data to be processed from the memory. For example, the processor may read one or more data blocks of the data to be processed from the memory via the plurality of channels. The channel description information may describe the plurality of channels.

According to embodiments of the present disclosure, the memory access description information is established, and the memory access efficiency may be determined according to the memory access description information and the channel description information. Accordingly, when the memory access efficiency is determined, if the memory access efficiency is low, the data partitioning method may be adjusted to improve the memory access efficiency, which may help improve a data processing capability of the electronic device.

It may be understood that the electronic device of the present disclosure has been described above, and the memory access description information of the present disclosure will be further described below.

In some embodiments, the size information of the data block to be tested may include a data read offset, the number of rows, and the number of columns. The memory access description information may be determined according to the data read offset, the number of rows, and the number of columns. The memory access description information may be implemented as a memory access description function, which will be further described below with reference to FIG. 2A.

Figure 2A:
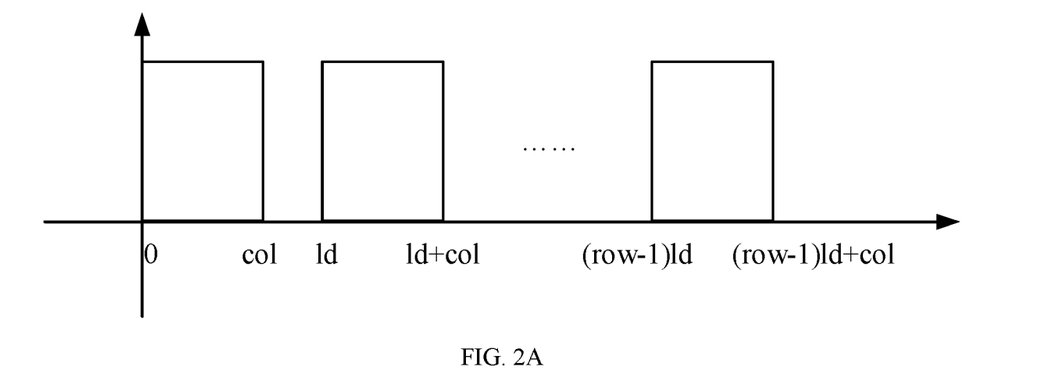
FIG. 2A shows a schematic diagram of a function image for a memory access description function according to an embodiment of the present disclosure.

FIG. 2A shows a schematic diagram of a function image for a memory access description function according to an embodiment of the present disclosure.

As shown in FIG. 2A, the memory access description function may be a periodic function, and a period of the function may be determined according to the data read offset. For example, the memory access description function x(t) may be expressed by Equation (1).

$$x(t) = \begin{cases} 1, & k*ld < t \leq k*ld + col \\ 0, & \text{others} \end{cases} \quad (1)$$

where k may be an integer greater than or equal to 0 and less than or equal to row-1, row may represent the number of rows, col may represent the number of columns, and ld may represent the data read offset.

It may be understood that the memory access description function shown in Equation (1) may be regarded as a product of a periodic function and a data interval. For example, the periodic function may correspond to the read period information, and the data interval may correspond to the data read interval.

In some embodiments, the read period information may be represented by a periodic square wave. A further description will be given below with reference to FIG. 2B.

Figure 2B:
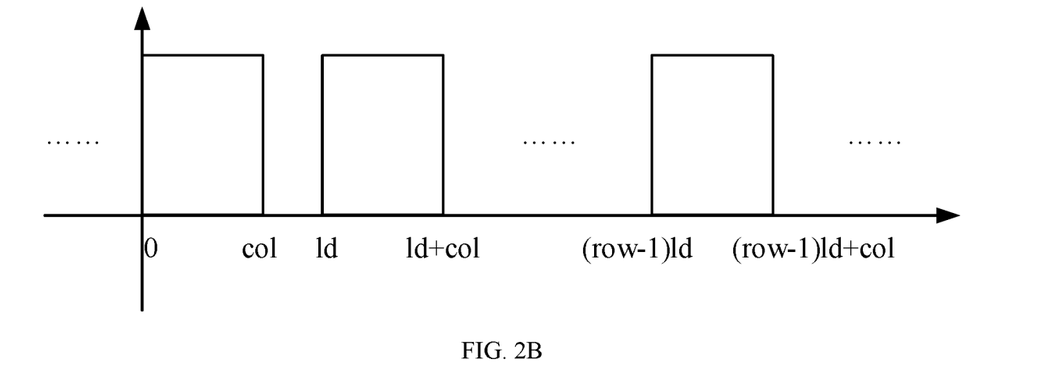
FIG. 2B shows a schematic diagram of a periodic square wave according to an embodiment of the present disclosure.

FIG. 2B shows a schematic diagram of a periodic square wave according to an embodiment of the present disclosure.

In embodiments of the present disclosure, a valid width of the square wave may be the number of columns, and a period of the periodic square wave may be determined according to the read offset. As shown in FIG. 2B, the read period function l(t) corresponding to the periodic square wave may be expressed by Equation (2).

$$l(t) = \begin{cases} 1, & k*ld < t \leq k*ld + col \\ 0, & \text{others} \end{cases} \quad (2)$$

In some embodiments, the data read interval may be determined according to the data read offset and the number of rows. A further description will be given below with reference to FIG. 2C.

Figure 2C:
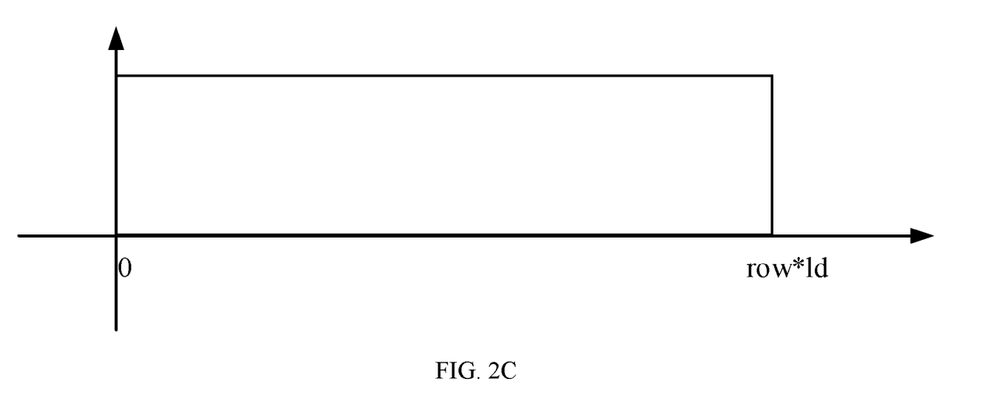
FIG. 2C shows a schematic diagram of a data read interval according to an embodiment of the present disclosure.

FIG. 2C shows a schematic diagram of a data read interval according to an embodiment of the present disclosure.

As shown in FIG. 2C, a first interval endpoint value corresponding to the data read interval may be 0, and a second interval endpoint value corresponding to the data read interval may be a product of the data read offset ld and the number of rows row, i.e., row*ld. For example, the function i(t) corresponding to the data read interval may be expressed by Equation (3).

$$i(t) = \begin{cases} 1 & 0 < t \leq (row-1)*ld + col \\ 0, & \text{others} \end{cases} \quad (3)$$

According to embodiments of the present disclosure, the memory access description information may be determined, and a modeling of a memory access behavior may be achieved, which helps determine the memory access efficiency accurately and quantifiably.

It may be understood that the memory access description information of the present disclosure has been described above, and the channel description information of the present disclosure will be described below with reference to FIG. 3A and FIG. 3B.

Figure 3A:
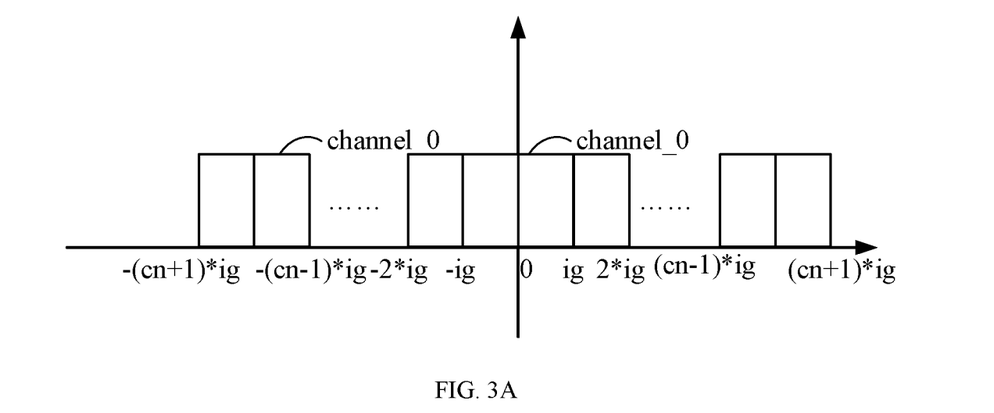
FIG. 3A shows a schematic diagram of a distribution of a plurality of channels according to an embodiment of the present disclosure.

FIG. 3A shows a schematic diagram of a distribution of a plurality of channels according to an embodiment of the present disclosure.

As shown in FIG. 3A, the number of channels may be cn, and the channel width of the channel may be ig.

In some embodiments, the channel description information may include the channel bandwidth of the channel. For example, the channel description information may be implemented as a channel description function. For a channel channel_0 in the plurality of channels, the function image for the channel description function of the channel channel_0 is shown in FIG. 3B.

Figure 3B:
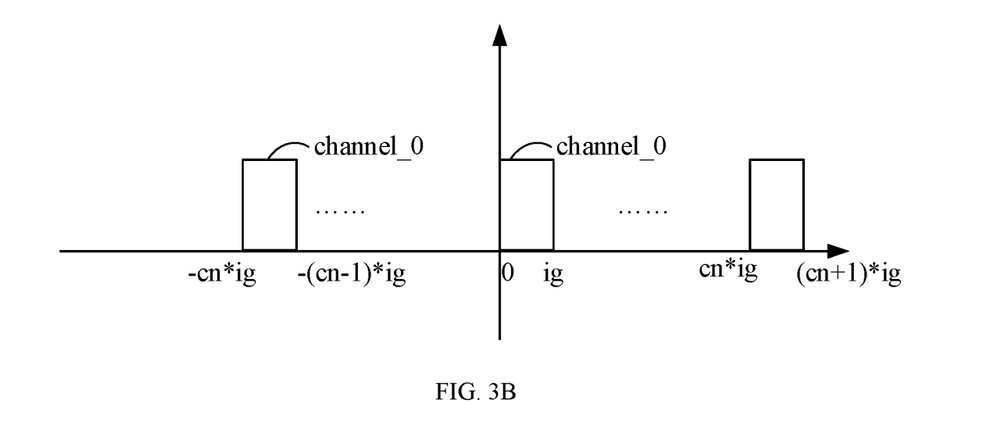
FIG. 3B shows a schematic diagram of a function image for a channel description function according to an embodiment of the present disclosure.

FIG. 3B shows a schematic diagram of a function image for a channel description function according to an embodiment of the present disclosure.

As shown in FIG. 3B, the channel width of the channel channel_0 may also be ig. For example, the channel description function of the channel channel_0 may be expressed by Equation (4).

$$c\_0(t) = \begin{cases} 1, & k*ig < t \leq (k+1)*ig \\ 0, & \text{others} \end{cases} \quad (4)$$

where k may be an integer greater than or equal to 0.

According to embodiments of the present disclosure, the channel description information may be determined, and a modeling of the channel may be achieved, which helps determine the memory access efficiency accurately and quantifiably.

It may be understood that the channel description information and the memory access description information of the present disclosure have been described above, and some methods of determining the memory access efficiency will be further described below.

In embodiments of the present disclosure, the processor may be configured to determine a memory access time for any channel according to an integral result of the memory access description information and the channel description information, the number of channels, and a first predetermined parameter. The first predetermined parameter may be related to the bandwidth of the channel. For example, for an $i^{th}$ channel in the cn channels, the memory access time $ci_t$ may be expressed by Equation (5).

$$ci_t = \frac{cn * \int_{-\infty}^{+\infty} c\_i(t) * l(t) * i(t) dt}{bw} \quad (5)$$

where bw may be the first predetermined parameter, c_i(t) may be the channel description function of the $i^{th}$ channel, and i may be an integer greater than or equal to 0 and less than or equal to cn−1.

As mentioned above, the memory access description information may include the read period information and the data read interval. In embodiments of the present disclosure, the processor may be further configured to determine the memory access time for any channel according to an integral value of the read period information and the channel description information in the data read interval, the number of channels, and the first predetermined parameter. For example, for the $i^{th}$ channel in the cn channels, the memory access time $ci_t$ may also be expressed by Equation (6).

$$ci_t = \frac{cn * \int_0^{ROW*LD} c\_i(t) * l(t) dt}{bw} \quad (6)$$

According to embodiments of the present disclosure, the data read interval may be used as an integral interval, which helps determine the memory access time.

In some embodiments, the processor may be further configured to determine a target channel from the plurality of channels. In embodiments of the present disclosure, when the data block to be tested is read from the memory in parallel by using the plurality of channels, the target channel may be a channel with a largest data transmission load. For example, when the data block to be tested is read from the memory in parallel by using the cn channels, if the channel channel_0 has the largest data transmission load, the channel channel_0 may be used as the target channel.

In some embodiments, the processor may be further configured to determine a target channel description information of the target channel. For example, when the target channel is the channel channel_0, the channel description information of the channel channel_0 may be used as the target channel description information.

In some embodiments, the processor may be further configured to determine a memory access efficiency of the processor in reading the data block to be tested according to the number of columns and the number of rows of the data block to be tested, the first predetermined parameter, and the target channel. For example, the memory access efficiency $\eta$ may be determined by Equation (7).

$$\eta = \frac{row * col}{bw * \max(c0_t, c1_t \ldots c\{cn-1\}_t)} \quad (7)$$

where $\max(c0_t, c1_t \ldots c\{cn-1\}_t)$ is a function for determining the target channel from the plurality of channels. When the target channel is the channel channel_0, Equation (7) may be converted to Equation (8).

$$\eta = \frac{row * col}{bw * c0_t} \quad (8)$$

Equation (8) may be then combined with Equation (6). That is, in embodiments of the present disclosure, the processor may be further configured to determine the memory access efficiency of the processor in reading the data block to be tested according to the integral value of the read period information and the target channel description information in the data read interval. For example, the memory access efficiency of the processor in reading the data block to be tested may be determined according to the number of the plurality of channels, the size information of the data block to be tested, and the integral value. If T=row*ld, the memory access efficiency may be determined by Equation (9).

$$\eta = \frac{row * col}{cn * \int_0^T c\_0(t) * l(t)dt} \quad (9)$$

As shown in Equation (9), Equation (2) and Equation (4), both c_0(t) and l(t) may be periodic functions. To determine the above-mentioned integral value, it is possible to convert the related function into a frequency domain. A conversion method may include, for example, Fourier series expansion, Fourier transform, wavelet transform, etc. When performing Fourier series expansion, for example, if the related function is an even function, only cosine terms may exist in the overall series to reduce a computational cost. Accordingly, in embodiments of the present disclosure, the processor may be configured to adjust the read period function, the target channel description function and the data read interval respectively to obtain an adjusted read period function and an adjusted target channel description function. A detailed description will be given below with reference to FIG. 4A to FIG. 4C.

Figure 4A:
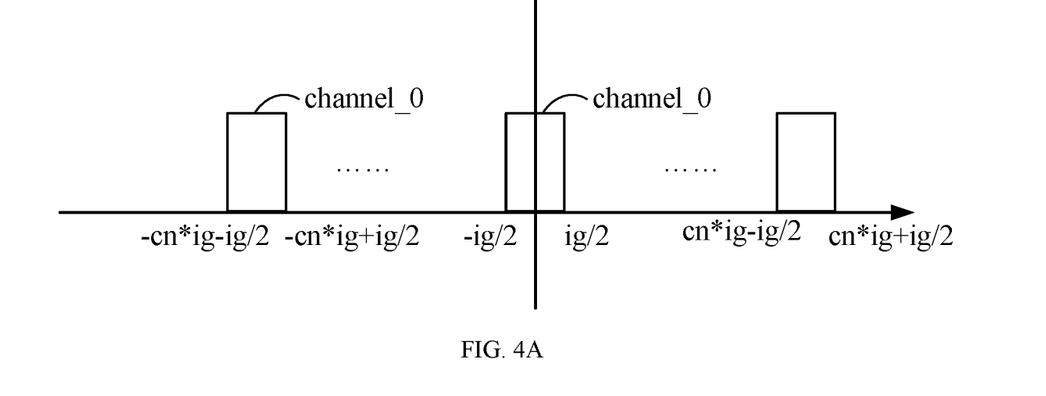
FIG. 4A shows a schematic diagram of a function image for an adjusted target channel description function according to an embodiment of the present disclosure.

FIG. 4A shows a schematic diagram of a function image for an adjusted target channel description function according to an embodiment of the present disclosure. As shown in FIG. 4A, the target channel description function may be translated by ½ channel width along a horizontal axis, so as to obtain the adjusted target channel function. The adjusted target channel function may be an even function.

Figure 4B:
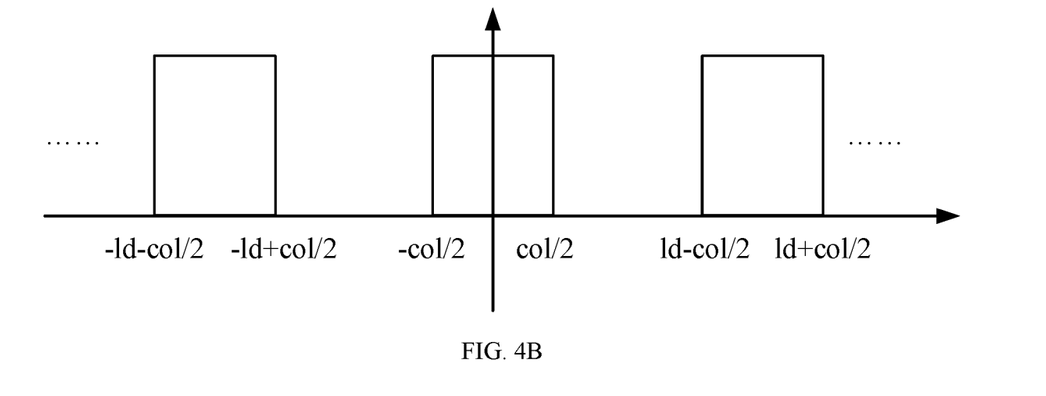
FIG. 4B shows a schematic diagram of an adjusted periodic square wave according to an embodiment of the present disclosure.

FIG. 4B shows a schematic diagram of an adjusted periodic square wave according to an embodiment of the present disclosure. The read period function may be translated by ½ column data along the horizontal axis, so as to obtain the adjusted read period function. The adjusted read period function may be an even function. The adjusted read period function may be represented by the adjusted periodic square wave as shown in FIG. 4B.

Figure 4C:
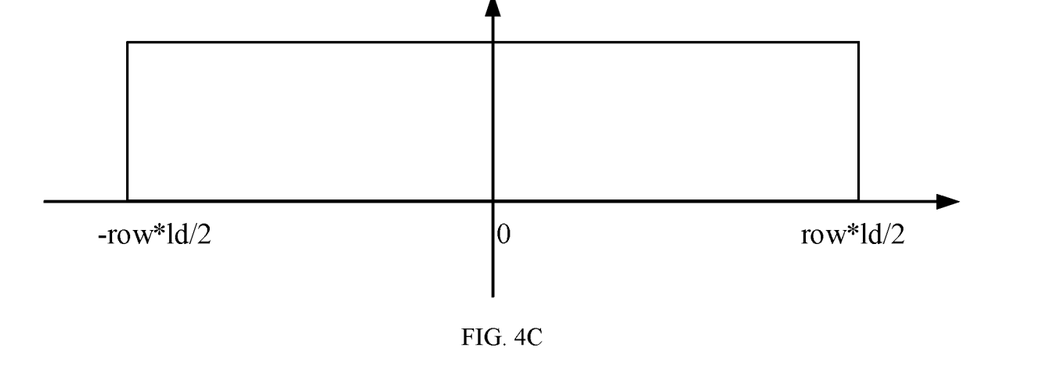
FIG. 4C shows a schematic diagram of an adjusted data read interval according to an embodiment of the present disclosure.

FIG. 4C shows a schematic diagram of an adjusted data read interval according to an embodiment of the present disclosure. As shown in FIG. 4C, the data read interval may be translated by ½ of the above-mentioned product (row*ld) along the horizontal axis, so as to obtain the adjusted data read interval.

After the read period function, the target channel description function and the data read interval are adjusted respectively, in embodiments of the present disclosure, the processor may be further configured to determine the memory access efficiency of the processor in reading the data block to be tested according to the number of the plurality of channels, the size information of the data block to be tested, and an integral value of the adjusted read period information and the adjusted target channel description information in the adjusted data read interval. For example, the memory access efficiency may be determined by Equation (10).

$$\eta = \frac{row * col}{cn * \int_{-\frac{T}{2}}^{+\frac{T}{2}} c\_0(t) * l(t)dt} \quad (10)$$

Then, the processor may be configured to determine a plurality of first frequency domain components of the read period information and determine a plurality of second frequency domain components of the target channel description information. For example, the processor may be further configured to perform a Fourier series expansion on the read period information to obtain the plurality of first frequency domain components, and perform a Fourier series expansion on the target channel description information to obtain the plurality of second frequency domain components.

For another example, if the function $f(t)$ is an even function and a periodic function, an n-level Fourier expansion of the function $f(t)$ may be expressed by Equation (11).

$$f(t) = \Sigma_{n=0}^{\infty} a_n \cos(n\omega t) \quad (11)$$

where the period of the function $f(t)$ may be $T_f$, $\omega$ may be the frequency corresponding to the period, and $a_n$ may be an $n^{th}$-level expansion parameter. The frequency $\omega$, the $0^{th}$-level expansion parameter $a_0$ and the $n^{th}$-level expansion parameter $a_n$ may be respectively expressed as follows.

$$\omega = \frac{2\pi}{T} \quad (12)$$

$$a_0 = r \quad (13)$$

$$a_n = \frac{2}{n\pi} \sin(nr\pi) \quad (14)$$

where r may be a duty cycle of the function $f(t)$

Accordingly, an $n_c$-level Fourier expansion of the target channel description function c_0(t) may be expressed by Equation (15).

$$c\_0(t) = \Sigma_{n_c=0}^{\infty} a_{n_c} \cos(n_c \omega_c t) \quad (15)$$

where the period of the target channel description function c_0(t) may be cn*ig, $\omega_c$ may be the frequency corresponding to the period, and $ac_{n_c}$ may be a nth-level expansion parameter. The frequency $\omega_c$, the $0^{th}$-level expansion parameter $ac_0$ and the $n_c^{th}$-level expansion parameter $ac_{n_c}$ may be respectively expressed as follows.

$$\omega_c = \frac{2\pi}{cn * ig} \quad (16)$$

$$ac_0 = \frac{1}{cn} \quad (17)$$

$$ac_{n_c} = \frac{2}{n_c\pi}\sin\left(\frac{n_c\pi}{cn}\right) \quad (18)$$

where 1/cn may be the duty cycle corresponding to the target channel description function c_0(t). It may be understood that the plurality of first frequency domain components may include $n_c$ first frequency domain components. An $n_c^{th}$ first frequency domain component may be $ac_{n_c} \cos(n_c\omega_c t)$.

In addition, an n r level Fourier expansion of the read periodic function l(t) may be expressed by Equation (19).

$$l(t) = \Sigma_{n=0}^{\infty} a_{n_l}\cos(n_l\omega_l t) \quad (19)$$

where the period of the read period function l(t) may be ld, $\omega_l$ may be the frequency corresponding to the period, and $al_{n_l}$ may be an $n_l^{th}$-level expansion parameter. The frequency $\omega_l$, the $0^{th}$-level expansion parameter $al_0$ and the $n_l^{th}$-level expansion parameter $al_{n_l}$ may be respectively expressed as follows.

$$\omega_l = \frac{2\pi}{ld} \quad (20)$$

$$al_0 = \frac{col}{ld} \quad (21)$$

$$al_{n_l} = \frac{2}{n_l\pi}\sin\left(\frac{n_l * col * \pi}{ld}\right) \quad (22)$$

where col/ld may be the duty cycle corresponding to the read period function l(t). It may be understood that the plurality of second frequency domain components may include $n_l$ second frequency domain components. An $n_l^{th}$ second frequency domain component may be $al_{n_l} \cos(n_l\omega_l t)$.

The plurality of first frequency domain components and the plurality of second frequency domain components may be obtained after the Fourier expansions are performed on the read period information and the target channel description information respectively. Then, in some embodiments, the processor may be configured to determine the memory access efficiency of the processor in reading the data block to be tested according to the plurality of first frequency domain components and the plurality of second frequency domain components.

For example, the integral value $$\int_{-\frac{T}{2}}^{+\frac{T}{2}} c\_0(t) * l(t)dt$$

may be determined according to the plurality of first frequency domain components and the plurality of second frequency domain components. The integral value may be expressed by Equation (23).

$$\int_{-\frac{T}{2}}^{+\frac{T}{2}} c\_0(t) * l(t)dt = \quad (23)$$

$$\int_{-\frac{T}{2}}^{+\frac{T}{2}} \left[\left(\Sigma_{n_c=0}^{\infty} ac_{n_c}\cos(n_c\omega_c t)\right) * \left(\Sigma_{n_l=0}^{\infty} al_{n_l}\cos(n_l\omega_l t)\right)\right]dt$$

For another example, it is possible to provide an intermediate parameter $p(n_c, n_l)$, which may be expressed by Equation (24).

$$p(n_c, n_l) = \int_{-\frac{T}{2}}^{+\frac{T}{2}} ac_{n_c} * al_{n_l}\cos(n_c\omega_c t)\cos(n_l\omega_l t)dt = \quad (24)$$

$$\frac{ac_{n_c} * al_{n_l} * T}{2}\left[\text{sinc}\left(\frac{T}{2}(n_c\omega_c + n_l\omega_l)\right) + \text{sinc}\left(\frac{T}{2}(n_c\omega_c - n_l\omega_l)\right)\right]$$

where sinc( ) may be a sinc function.

Accordingly, based on Equation (23) and Equation (24), the integral value may be determined by Equation (25).

$$\int_{-\frac{T}{2}}^{+\frac{T}{2}} c\_0(t) * l(t)dt = \Sigma_{n_c=0}^{\infty}\Sigma_{n_l=0}^{\infty} p(n_c, n_l) \quad (25)$$

Then, the processor may determine the memory access efficiency according to the number of the plurality of channels, the size information of the data block to be tested, and the integral value. For example, the memory access efficiency may be determined according to Equation (25) and Equation (10). In an example, $n_c$ may be 5, and $n_l$ may also be 5.

In embodiments of the present disclosure, the memory access efficiency of the processor in reading the data block to be tested may indicate a data transmission load uniformity in the plurality of channels when the processor reads the data block to be tested in parallel from the memory via the plurality of channels. According to embodiments of the present disclosure, when the size information (the data read offset, the number of columns, and the number of rows) of the data block to be tested is determined, a degree of conflict between channels may be determined accurately. In addition, determining the memory access efficiency according to the size information has a good generalization ability and may adapt to data blocks of different sizes, and may also be implemented to accurately determine the memory access efficiency when the data read offset is various values. Furthermore, it is possible to adjust the partitioning method to improve the memory access efficiency and reduce the channel conflict.

It may be understood that the electronic device of the present disclosure has been described above, and a method of determining a memory access efficiency for a memory of the present disclosure will be described below.

Figure 5:
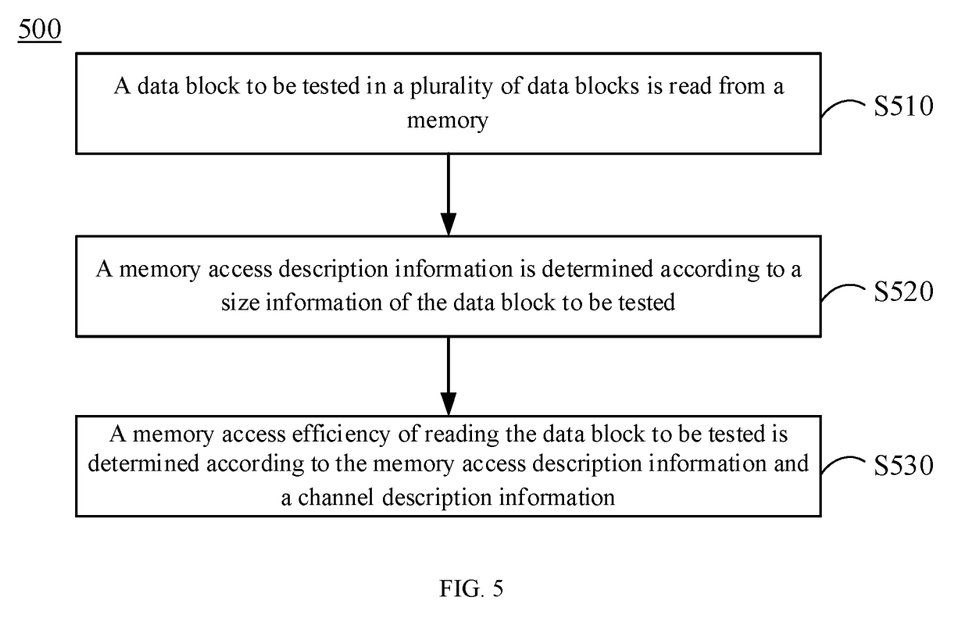
FIG. 5 shows a flowchart of a method of determining a memory access efficiency for a memory according to an embodiment of the present disclosure.

FIG. 5 shows a flowchart of a method of determining a memory access efficiency for a memory according to an embodiment of the present disclosure.

As shown in FIG. 5, a method 500 may include operation S510 to operation S530.

In operation S510, a data block to be tested in a plurality of data blocks is read from a memory.

In operation S520, a memory access description information is determined according to a size information of the data block to be tested.

In embodiments of the present disclosure, the memory access description information includes a read period information and a data read interval.

In operation S530, a memory access efficiency of reading the data block to be tested is determined according to the memory access description information and a channel description information.

In embodiments of the present disclosure, the channel description information describes a plurality of channels for reading the data to be processed from the memory.

It may be understood that the method 500 may be performed by the above-mentioned processor 120. It may also be understood that the method 500 may be performed to determine the memory access efficiency related to the memory 110.

In some embodiments, the size information of the data block to be tested includes a data read offset, a number of rows, and a number of columns. The read period information is represented by a periodic square wave. A valid width of the square wave is the number of columns. A period of the periodic square wave is determined according to the data read offset. The data read interval is determined according to the data read offset and the number of rows.

In some embodiments, determining the memory access efficiency of the processor in reading the data block to be tested according to the memory access description information and the channel description information includes determining a target channel from the plurality of channels. For example, the target channel is a channel with a largest data transmission load when the data block to be tested is read from the memory in parallel by using the plurality of channels. A target channel description information of the target channel may be determined. For example, the target channel description information includes a channel bandwidth of the target channel. The memory access efficiency of the processor in reading the data block to be tested may be determined according to an integral value of the read period information and the target channel description information in the data read interval.

In some embodiments, determining the memory access efficiency of the processor in reading the data block to be tested according to the integral value of the read period information and the target channel description information in the data read interval includes determining the memory access efficiency of the processor in reading the data block to be tested according to the number of the plurality of channels, the size information of the data block to be tested, and the integral value.

In some embodiments, determining the memory access efficiency of the processor in reading the data block to be tested according to the integral value of the read period information and the target channel description information in the data read interval includes: determining a plurality of first frequency domain components of the read period information and determining a plurality of second frequency domain components of the target channel description information; and determining the memory access efficiency of the processor in reading the data block to be tested according to the plurality of first frequency domain components and the plurality of second frequency domain components.

In some embodiments, determining the plurality of first frequency domain components of the read period information and determining the plurality of second frequency domain components of the target channel description information includes: performing a Fourier series expansion on the read period information to obtain the plurality of first frequency domain component; and performing a Fourier series expansion on the target channel description information to obtain the plurality of second frequency domain components.

In some embodiments, the memory access efficiency of the processor in reading the data block to be tested indicates a data transmission load uniformity in the plurality of channels when the processor reads the data block to be tested in parallel from the memory via the plurality of channels.

In technical solutions of the present disclosure, a collection, a storage, a use, a processing, a transmission, a provision, a disclosure, an application and other processing of user personal information involved comply with provisions of relevant laws and regulations, take essential confidentiality measures, and do not violate public order and good custom. In the technical solution of the present disclosure, authorization or consent is obtained from the user before the user's personal information is obtained or collected.

According to embodiments of the present disclosure, the present disclosure further provides an electronic device, a readable storage medium, and a computer program product.

Figure 6:
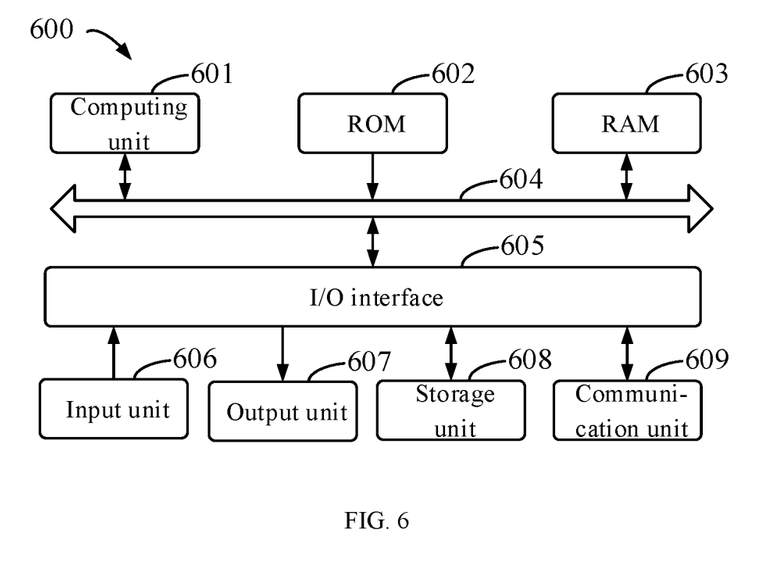
FIG. 6 shows a block diagram of an electronic device to which a method of determining a memory access efficiency for a memory may be applied, according to an embodiment of the present disclosure.

FIG. 6 shows a schematic block diagram of an example electronic device 600 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 6, the electronic device 600 includes a computing unit 601 which may perform various appropriate actions and processes according to a computer program stored in a read only memory (ROM) 602 or a computer program loaded from a storage unit 608 into a random access memory (RAM) 603. In the RAM 603, various programs and data necessary for an operation of the electronic device 600 may also be stored. The computing unit 601, the ROM 602 and the RAM 603 are connected to each other through a bus 604. An input/output (I/O) interface 605 is also connected to the bus 604.

A plurality of components in the electronic device 600 are connected to the I/O interface 605, including: an input unit 606, such as a keyboard, or a mouse; an output unit 607, such as displays or speakers of various types; a storage unit 608, such as a disk, or an optical disc; and a communication unit 609, such as a network card, a modem, or a wireless communication transceiver. The communication unit 609 allows the electronic device 600 to exchange information/data with other devices through a computer network such as Internet and/or various telecommunication networks.

The computing unit 601 may be various general-purpose and/or dedicated processing assemblies having processing and computing capabilities. Some examples of the computing units 601 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 601 executes various methods and processes described above, such as the method of determining the memory access efficiency. For example, in some embodiments, the method of determining the memory access efficiency may be implemented as a computer software program which is tangibly embodied in a machine-readable medium, such as the storage unit 608. In some embodiments, the computer program may be partially or entirely loaded and/or installed in the electronic device 600 via the ROM 602 and/or the communication unit 609. The computer program, when loaded in the RAM 603 and executed by the computing unit 601, may execute one or more steps in the method of determining the memory access efficiency described above. Alternatively, in other embodiments, the computing unit 601 may be used to perform the method of determining the memory access efficiency by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

A computer system may include a client and a server. The client and the server are generally far away from each other and usually interact through a communication network. A relationship between the client and the server is generated through computer programs running on the corresponding computers and having a client-server relationship with each other. The server may be a cloud server, a server for a distributed system, or a server combined with a blockchain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. An electronic device, comprising:
a memory configured to store executable instructions and data to be processed, wherein the data to be processed is divided into a plurality of data blocks; and
a processor configured to execute the executable instructions so as to at least:
read a data block to be tested in the plurality of data blocks from the memory;
determine a memory access description information according to a size information of the data block to be tested, wherein the memory access description information comprises a read period information and a data read interval; and
determine, according to the memory access description information and a channel description information, a memory access efficiency of the processor in reading the data block to be tested, wherein the channel description information describes a plurality of channels for the processor to read the data to be processed from the memory.

2. The electronic device according to claim 1, wherein the size information of the data block to be tested comprises a data read offset, a number of rows, and a number of columns; the read period information is represented by a periodic square wave, a valid width of the periodic square wave is the number of columns, and a period of the periodic square wave is determined according to the data read offset; and the data read interval is determined according to the data read offset and the number of rows.

3. The electronic device according to claim 2, wherein the processor is further configured to:
 determine a target channel from the plurality of channels, wherein the target channel is a channel with a largest data transmission load when the data block to be tested is read from the memory in parallel by using the plurality of channels;
 determine a target channel description information of the target channel, wherein the target channel description information comprises a channel bandwidth of the target channel; and
 determine the memory access efficiency of the processor in reading the data block to be tested according to an integral value of the read period information and the target channel description information in the data read interval.

4. The electronic device according to claim 3, wherein the processor is further configured to determine the memory access efficiency of the processor in reading the data block to be tested according to a number of the plurality of channels, the size information of the data block to be tested, and the integral value.

5. The electronic device according to claim 1, wherein the processor is further configured to:
 determine a target channel from the plurality of channels, wherein the target channel is a channel with a largest data transmission load when the data block to be tested is read from the memory in parallel by using the plurality of channels;
 determine a target channel description information of the target channel, wherein the target channel description information comprises a channel bandwidth of the target channel; and
 determine the memory access efficiency of the processor in reading the data block to be tested according to an integral value of the read period information and the target channel description information in the data read interval.

6. The electronic device according to claim 5, wherein the processor is further configured to determine the memory access efficiency of the processor in reading the data block to be tested according to a number of the plurality of channels, the size information of the data block to be tested, and the integral value.

7. The electronic device according to claim 5, wherein the processor is further configured to:
 determine a plurality of first frequency domain components of the read period information and determine a plurality of second frequency domain components of the target channel description information; and
 determine the memory access efficiency of the processor in reading the data block to be tested according to the plurality of first frequency domain components and the plurality of second frequency domain components.

8. The electronic device according to claim 7, wherein the processor is further configured to:
 perform a Fourier series expansion on the read period information to obtain the plurality of first frequency domain components; and
 perform a Fourier series expansion on the target channel description information to obtain the plurality of second frequency domain components.

9. The electronic device according to claim 1, wherein the memory access efficiency of the processor in reading the data block to be tested indicates a data transmission load uniformity in the plurality of channels when the processor reads the data block to be tested in parallel from the memory via the plurality of channels.

10. A method of determining a memory access efficiency for a memory, the method comprising:
 reading a data block to be tested in a plurality of data blocks from the memory;
 determining a memory access description information according to a size information of the data block to be tested, wherein the memory access description information comprises a read period information and a data read interval; and
 determining a memory access efficiency of reading the data block to be tested according to the memory access description information and a channel description information, wherein the channel description information describes a plurality of channels for reading data to be processed from the memory.

11. The method according to claim 10, wherein the size information of the data block to be tested comprises a data read offset, a number of rows, and a number of columns; the read period information is represented by a periodic square wave, a valid width of the periodic square wave is the number of columns, and a period of the periodic square wave is determined according to the data read offset; and the data read interval is determined according to the data read offset and the number of rows.

12. The method according to claim 11, wherein the determining a memory access efficiency of the processor in reading the data block to be tested according to the memory access description information and a channel description information comprises:
 determining a target channel from the plurality of channels, wherein the target channel is a channel with a largest data transmission load when the data block to be tested is read from the memory in parallel by using the plurality of channels;
 determining a target channel description information of the target channel, wherein the target channel description information comprises a channel bandwidth of the target channel; and
 determining the memory access efficiency of the processor in reading the data block to be tested according to an integral value of the read period information and the target channel description information in the data read interval.

13. The method according to claim 12, wherein the determining the memory access efficiency of the processor in reading the data block to be tested according to an integral value of the read period information and the target channel description information in the data read interval comprises determining the memory access efficiency of the processor in reading the data block to be tested according to the number of the plurality of channels, the size information of the data block to be tested, and the integral value.

14. The method according to claim 10, wherein the determining a memory access efficiency of the processor in reading the data block to be tested according to the memory access description information and a channel description information comprises:
  determining a target channel from the plurality of channels, wherein the target channel is a channel with a largest data transmission load when the data block to be tested is read from the memory in parallel by using the plurality of channels;
  determining a target channel description information of the target channel, wherein the target channel description information comprises a channel bandwidth of the target channel; and
  determining the memory access efficiency of the processor in reading the data block to be tested according to an integral value of the read period information and the target channel description information in the data read interval.

15. The method according to claim 14, wherein the determining the memory access efficiency of the processor in reading the data block to be tested according to an integral value of the read period information and the target channel description information in the data read interval comprises determining the memory access efficiency of the processor in reading the data block to be tested according to the number of the plurality of channels, the size information of the data block to be tested, and the integral value.

16. The method according to claim 14, wherein the determining the memory access efficiency of the processor in reading the data block to be tested according to an integral value of the read period information and the target channel description information in the data read interval comprises:
  determining a plurality of first frequency domain components of the read period information and determining a plurality of second frequency domain components of the target channel description information; and
  determining the memory access efficiency of the processor in reading the data block to be tested according to the plurality of first frequency domain components and the plurality of second frequency domain components.

17. The method according to claim 16, wherein the determining a plurality of first frequency domain components of the read period information and determining a plurality of second frequency domain components of the target channel description information comprises:
  performing a Fourier series expansion on the read period information to obtain the plurality of first frequency domain components; and
  performing a Fourier series expansion on the target channel description information to obtain the plurality of second frequency domain components.

18. The method according to claim 10, wherein the memory access efficiency of the processor in reading the data block to be tested indicates a data transmission load uniformity in the plurality of channels when the processor reads the data block to be tested in parallel from the memory via the plurality of channels.

19. An electronic device, comprising:
  at least one processor; and
  a memory communicatively connected to the at least one processor, wherein the memory stores instructions executable by the at least one processor, and the instructions, when executed by the at least one processor, are configured to cause the at least one processor to implement at least the method of claim 10.

20. A non-transitory computer-readable storage medium having computer instructions therein, the computer instructions, when executed by a computer system, configured to cause the computer system to at least:
  read a data block to be tested in a plurality of data blocks from the memory;
  determine a memory access description information according to a size information of the data block to be tested, wherein the memory access description information comprises a read period information and a data read interval; and
  determine a memory access efficiency of reading the data block to be tested according to the memory access description information and a channel description information, wherein the channel description information describes a plurality of channels for reading data to be processed from the memory.

* * * * *